United States Patent
Jeong et al.

(10) Patent No.: US 8,301,187 B2
(45) Date of Patent: Oct. 30, 2012

(54) METHODS AND APPARATUS FOR RECOVERING VIDEO INFORMATION IN A MOBILE COMMUNICATION SYSTEM

(75) Inventors: Wook-Hyun Jeong, Suwon-si (KR); Jong-Cheul Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1115 days.

(21) Appl. No.: 12/189,469

(22) Filed: Aug. 11, 2008

(65) Prior Publication Data

US 2009/0040290 A1 Feb. 12, 2009

(30) Foreign Application Priority Data

Aug. 10, 2007 (KR) .................. 10-2007-0080479

(51) Int. Cl.
*H04M 1/00* (2006.01)
(52) U.S. Cl. ............... 455/550.1; 348/14.01; 348/14.02; 709/202; 709/203
(58) Field of Classification Search .... 348/14.01–14.16; 370/259–271, 351–356; 455/412.1–417, 455/426.1, 426.2, 550.1–560; 709/201–207, 709/217–248
See application file for complete search history.

(56) References Cited

U.S. PATENT DOCUMENTS

| | | | | |
|---|---|---|---|---|
| 6,697,983 | B1 * | 2/2004 | Chintada et al. | 714/748 |
| 7,756,127 | B2 * | 7/2010 | Nagai et al. | 370/389 |
| 7,796,499 | B2 * | 9/2010 | Thorell et al. | 370/216 |
| 8,107,539 | B2 * | 1/2012 | Hannuksela et al. | 375/240.26 |
| 2003/0158899 | A1 * | 8/2003 | Hughes | 709/205 |
| 2004/0027991 | A1 * | 2/2004 | Jang et al. | 370/230 |
| 2004/0252761 | A1 * | 12/2004 | Brown et al. | 375/240.12 |
| 2006/0034186 | A1 * | 2/2006 | Kim et al. | 370/252 |
| 2006/0048193 | A1 * | 3/2006 | Jacobs et al. | 725/81 |
| 2006/0087687 | A1 * | 4/2006 | Eom | 358/1.15 |
| 2006/0146830 | A1 * | 7/2006 | Lin et al. | 370/394 |
| 2007/0297339 | A1 * | 12/2007 | Taylor et al. | 370/248 |
| 2010/0208668 | A1 * | 8/2010 | Dumazy | 370/329 |

* cited by examiner

Primary Examiner — Hemant Patel
(74) Attorney, Agent, or Firm — Jefferson IP Law, LLP

(57) ABSTRACT

Provided are an apparatus and methods for recovering video information when operating in an area that impairs an electromagnetic field of a transmit/receive signal during a video telephony of a portable terminal. A method of which includes determining a number of buffers for storing intra coded (I) frames to be received, transmitting the number of the buffers to a counterpart terminal together with a VFU signal, acquiring video information by storing I frames received from the counterpart terminal, and generating video frames using the acquired video information.

20 Claims, 4 Drawing Sheets

METHODS AND APPARATUS FOR RECOVERING VIDEO INFORMATION IN A MOBILE COMMUNICATION SYSTEM

PRIORITY

This application claims the benefit under 35 U.S.C. §119(a) of a Korean patent application filed in the Korean Intellectual Property Office on Aug. 10, 2007 and assigned Serial No. 2007-80479, the entire disclosure of which is hereby incorporated by reference.

BACKGROUND OF THE INVENTION

1. Field of the Invention

The present invention relates to an apparatus and a method for a video telephony function of a portable terminal. More particularly, the present invention relates to a method and an apparatus for recovering video information in an area that impairs an electromagnetic field of a transmit/receive signal during a video telephony function of a portable terminal.

2. Description of the Related Art

Portable terminals are prevalently used without distinction of age and sex as a necessity in the modern life. Service providers and terminal manufactures are competitively developing products (or services) to distinguish their products (or services) from others.

For example, the portable terminal is advancing to a multimedia device which provides various services of a phone book, a game, a short message, an e-mail, a morning call, a Moving Picture Experts Group (MPEG) audio layer 3 (MP3), a digital camera, a wireless internet service and the like. In accordance with advances of the information communication technology including the Internet, the portable terminal provides a video telephony service as well as a text service and a voice telephony service.

For video communications, a portable terminal supporting a video telephony service captures images of a user, compresses the captured user video, and transmits the compressed video to a correspondent portable terminal. A terminal, receiving the compressed user video, recovers the original user video and displays the original user video on a display.

Hence, the users of the two portable terminals can communicate with each other while viewing the other user. In addition, the user of the portable terminal can save contents of a video call to the portable terminal during the call, or transmit video or image data stored in the portable terminal to the other user in real time.

When an error is detected in the video information through a Cyclic Redundancy Check (CRC), the video telephony service decodes the corrupted video information without discarding it and sends a Video Fast Update (VFU) signal to the other portable terminal.

The portable terminal receiving the VFU signal generates and transmits intra coded (I) frames to the other portable terminal.

However, when the portable terminal providing the video communication service is operating in an area that impairs an electromagnetic field of the transmit/receive signal, the VFU signal is transmitted until the portable terminal moves out of the area that impairs the electromagnetic field of the transmit/receive signal. In this situation, the portable terminal receiving the VFU signal needs to generate the I-frame occasionally in mid course.

In other words, while the portable terminal can block a transmission of the video information stream resulting in an error that is constituted mostly of Predicted (P) frames by decoding the video information using the I frames received through the VFU signal, a transmission resulting in an error is unavoidable in the area that impairs the electromagnetic field of the transmit/receive signal.

Therefore, what is needed is a method and an apparatus for recovering video information, according to a condition of an area that impairs an electromagnetic field of a transmit/receive signal, in a video telephony service of a portable terminal.

SUMMARY OF THE INVENTION

An aspect of the present invention is to address at least the above mentioned problems and/or disadvantages and to provide at least the advantages described below. Accordingly, an aspect of the present invention is to provide a method and an apparatus for providing a video communication service by preventing a transmission in an area that impairs an electromagnetic field of a transmit/receive signal that would result in an error in a portable terminal.

Another aspect of the present invention is to provide a method and an apparatus for removing noise from video information using a Video Fast Update (VFU) in a portable terminal.

The above aspects are addressed by providing a method for recovering video information of a video communication service in a terminal. The method includes determining a number of buffers for storing intra coded (I) frames to be received, transmitting the number of the buffers to a counterpart terminal together with a VFU signal, acquiring video information by storing I frames received from the counterpart terminal, and generating video frames using the acquired video information.

According to one aspect of the present invention, a method for recovering video information of a video communication service in a counterpart terminal is provided. The method includes receiving a Video Fast Update (VFU) signal comprising a number of buffers for storing intra coded (I) frames, from a counterpart terminal, generating I frames according to the received signal, and transmitting to the counterpart terminal as many generated I frames as the number of the buffers.

According to another aspect of the present invention, an apparatus for recovering video information of a video communication service in a portable terminal is provided. The apparatus includes a video communication manager for determining a number of buffers for storing intra coded (I) frames and for generating video frames by acquiring video information from the I frames, and a Micro-Processor Unit (MPU) for controlling transmission of the number of the store buffers to a counterpart terminal together with a Video Fast Update (VFU) signal and reception of I frames from the counterpart terminal.

According to yet another aspect of the present invention, an apparatus for recovering video information of a video communication service in a counterpart portable terminal is provided. The apparatus includes a video communication manager for, when receiving a Video Fast Update (VFU) signal which comprises a number of buffers for storing intra coded (I) frames, generating I frames and transmitting to a counterpart terminal as many generated I frames as the number of the buffers.

According to still another aspect of the present invention, a mobile communication system for recovering video information of a video service is provided. The system includes a first terminal for generating video frames by acquiring video information from intra coded (I) frames, and a second terminal for, when receiving a signal requesting transmission of the I frames, generating and transmitting a plurality of the I frames to the first terminal.

According to a further aspect of the present invention, a method for recovering video information of a video service in a mobile communication system is provided. The method includes recovering, at a first terminal, video information by acquiring video information from intra coded (I) frames and generating video frames, and when receiving a signal requesting transmission of the I frames, recovering, at a second terminal, video information by generating and transmitting a plurality of the I frames to the first terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method and an apparatus for recovering video information corrupted by a transmission error caused by operating in an area that impairs an electromagnetic field of a transmit/receive signal when a mobile communication system provides a video communication service.

Figure 1:
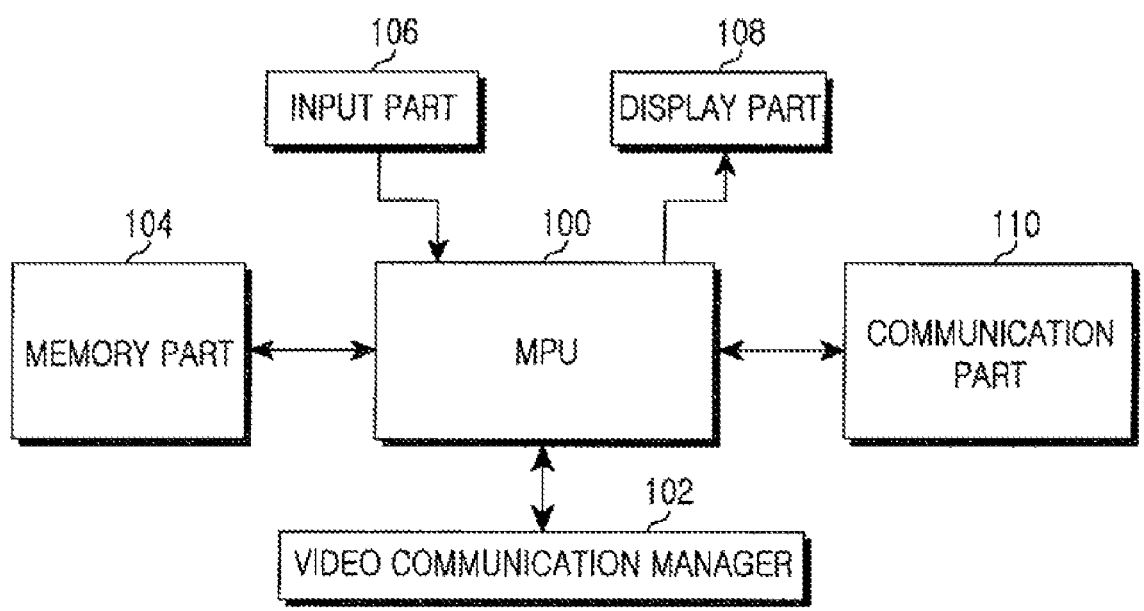
FIG. 1 is a block diagram of a portable terminal for recovering video information corrupted by a transmission error according to an exemplary embodiment of the present invention.

FIG. 1 is a block diagram of a portable terminal for recovering video information corrupted by a transmission error according to an exemplary embodiment of the present invention.

Hereinafter, the portable terminal represents mobile communication terminals supporting video communications, such as International Mobile Telecommunication (IMT)-2000 terminal, fourth generation (4G) broadband system terminal and the like, and portable devices supporting video communications, such as a Personal Data Assistant (PDA) and the like. In the following description, a structure of the portable terminal is described.

The portable terminal of FIG. 1 can include a Micro-Processor Unit (MPU) 100, a video communication manager 102, a memory part 104, an input part 106, a display part 108, and a communication part 110.

The MPU 100 controls operations of the portable terminal. For example, the MPU 100 processes and controls voice telephony and data communications. In addition to the above identified functions, the MPU 100, upon detecting that the portable terminal is operating in an area that impairs an electromagnetic field of a transmit/receive signal while using a video communication service, controls the video communication manager 102 to determine a number of buffers for storing intra coded (I) frames.

Next, the MPU 100 controls to transmit the number of store buffers determined by the video communication manager 102 to a counterpart portable terminal together with a Video Fast Update (VFU) signal and to receive and store, from the counterpart portable terminal, I frames corresponding to the number of store buffers. The received I frames may be stored in the store buffers.

The MPU 100 directs the video communication manager 102 to acquire video information from the I frames.

Under the direction of the MPU 100, the video communication manager 102 determines the number of store buffers for the I frames to be received from the counterpart portable terminal.

Under the direction of the MPU 100, the video communication manager 102 generates video frames by acquiring the video information from the I frames received from the counterpart portable terminal.

Herein, the video communication manager 102 can acquire the video information through a median operation of the received I frames. More specifically, the video communication manager 102 arranges N-ary I frames received from the counterpart portable terminal in order and conducts the median operation to select a middle value, to thus attain the video information.

The median operation is applied to obtain one video information by securely removing pixel values that are too small or too great, which are caused by the transmission error.

The memory part 104 may includes a Read Only Memory (ROM), a Random Access Memory (RAM), and a flash ROM. The ROM stores microcodes and reference data of a program for the processing and the controlling of the MPU 100 and the video communication manager 102.

The RAM, which is a working memory of the MPU 100, contains temporary data generated during the execution of programs. The flash ROM contains various updatable data such as phone book, sent messages, and received messages.

The input part 106 includes a plurality of functional keys including numeric buttons 0~9, a menu button, a cancel (delete) button, an OK button, a TALK button, an END button, an Internet access button, navigation buttons (or arrow keys), and letter input keys. The input part 106 provides key input data (e.g., video communication request) corresponding to a key pressed by a user to the MPU 100.

The display part 108 displays status information, a limited number of letters, videos and still images during the operation of the portable terminal. The display part 108 can employ a color Liquid Crystal Display (LCD) and the like.

The communication part 110 processes transmission and reception of radio signals of the input and output data over an antenna (not shown). For instance, in the transmission, the communication part 110 channel-codes and spreads transmit data, Radio Frequency (RF)-processes the transmit data, and then sends the processed data. In the reception, the communication part 110 converts a received RF signal to a baseband signal and restores data by dispreading and channel-decoding the baseband signal.

While the MPU 100 can function as the video communication manager 102, they are illustrated and described separately to explain their functions. In an actual product, the functions of MPU 100 may include that of the video communication manager 102.

So far, the apparatus recovers the video information corrupted by the transmission error caused by operating in an area that impairs the electromagnetic field of a transmit/receive signal when the mobile communication system provides the video communication service. Described hereafter are methods for recovering the video information corrupted by a transmission error caused by operating in an area that impairs the electromagnetic field of a transmit/receive signal using an apparatus when a mobile communication system provides a video communication service according to an exemplary embodiment of the present invention.

Figure 2:
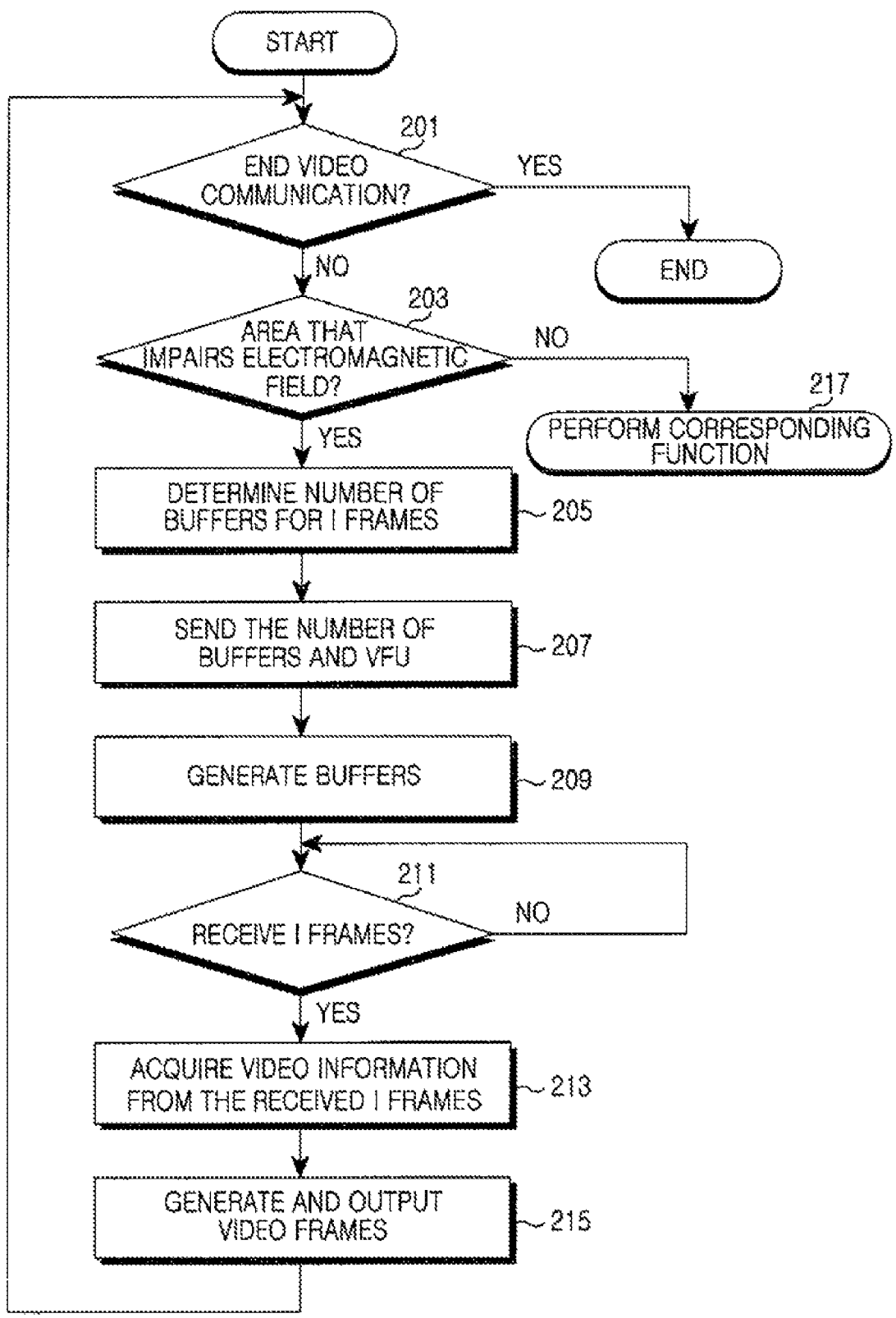
FIG. 2 is a flowchart illustrating a method of a portable terminal for recovering video information corrupted by a transmission error according to an exemplary embodiment of the present invention.

FIG. 2 is a flowchart illustrating a method of a portable terminal for recovering video information corrupted by a transmission error according to an exemplary embodiment of the present invention.

In FIG. 2, the portable terminal is assumed to be performing a video communication service.

In step 201, the MPU 100 of the potable terminal determines whether the user requests to end the video communication service or not.

When the request is not detected, the MPU 100 determines whether the portable terminal is positioned in an area that impairs an electromagnetic field of a transmit/receive signal in step 203.

Herein, the MPU 100 can determine if the portable terminal is positioned in an area that impairs an electromagnetic field of a transmit/receive signal by examining a Cyclic Redundancy Check (CRC) error rate of the received video information. In more detail, when the MPU 100 determines that the CRC error rate is over a preset threshold, the MPU 100 can determine that the portable terminal is located in an area that impairs an electromagnetic field of a transmit/receive signal.

When not located in the area that impairs an electromagnetic field of a transmit/receive signal, the MPU 100 performs the corresponding function in step 217 (e.g., the MPU 100 sustains the video communications or receives I frames through the VFU signal).

In contrast, when the portable terminal is located in an area that impairs an electromagnetic field of a transmit/receive signal, the MPU 100 controls the video communication manager 102 to determine a number of the buffers for storing I frames in step 205, and transmits the number of the store buffers determined by the video communication manager 102 to the counterpart portable terminal together with the VFU signal in step 207.

In step 209, the MPU 100 generates as many buffers as the number of the buffers for storing I frames determined by the video communication manager 102. In step 211, the MPU 100 determines whether I frames corresponding to the number of the buffers are received from the counterpart portable terminal.

Herein, the received I frames can be stored in the generated buffers respectively.

When the I frames corresponding to the number of the buffers are not received from the counterpart portable terminal, the MPU 100 can repeat the step 211.

The controller 100 can determine whether the I frames are received or not by determining a sequence number of the I frames received from the counterpart portable terminal.

In contrast, upon receiving the I frames corresponding to the number of the buffers from the counterpart portable terminal, the MPU 100 directs the video communication manager 102 to acquire video information from the received I frames in step 213.

In step 215, the MPU 100 controls the video communication manager 102 to generate video frames using the video information obtained from the I frames, and controls to output the video frames generated by the video communication manager 102 via the display part 108.

Herein, under the direction of the MPU 100, the video communication manager 102 can acquire the video information by applying the received I frames to the median operation.

More specifically, the video communication manager 102 arranges N-ary I frames received from the counterpart portable terminal in order, selects a middle value, and conducts the median operation to determine the corresponding pixel value, to acquire the video information.

The median operation is applied to obtain one video information by securely removing pixel values that are too small or too great pixel, which are caused by the transmission error.

Next, the MPU 100 finishes this process.

Figure 3:
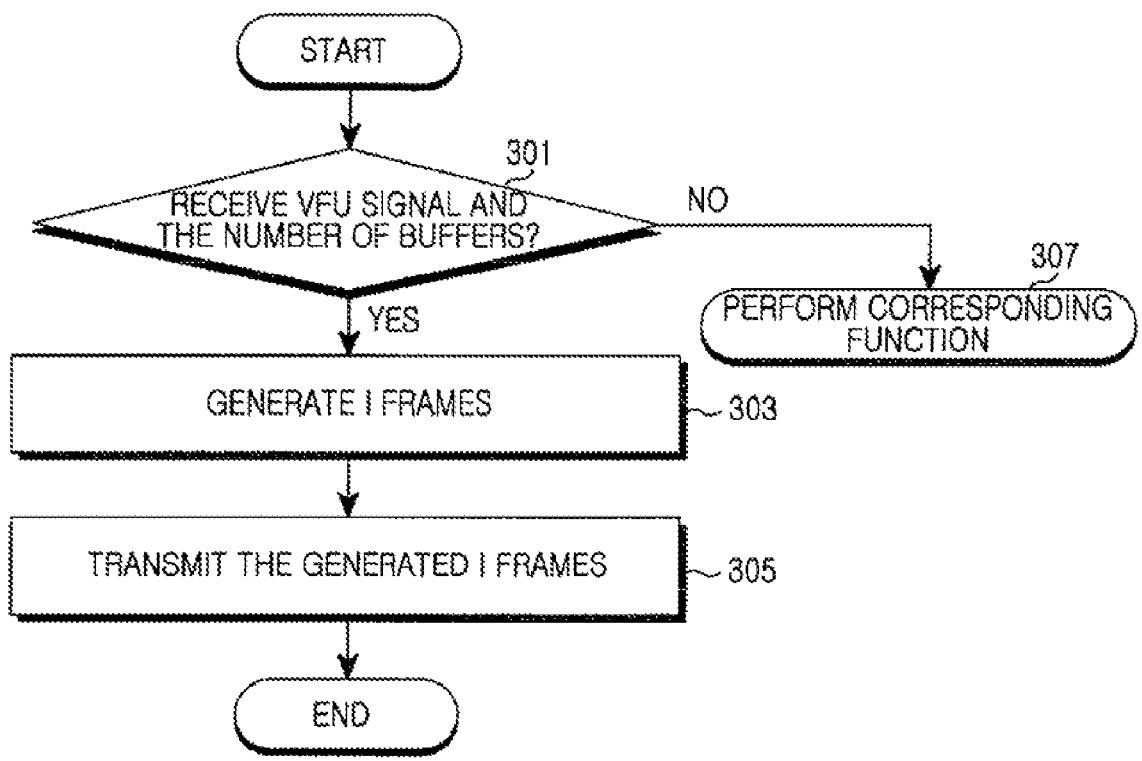
FIG. 3 is a flowchart illustrating a method of a counterpart portable terminal for recovering video information corrupted by a transmission error according to an exemplary embodiment of the present invention.

FIG. 3 is a flowchart illustrating a method of a counterpart portable terminal for recovering video information corrupted by a transmission error according to an exemplary embodiment of the present invention.

In step 301, the MPU 100 of the portable terminal determines whether the VFU signal and a number of the buffers storing the I frames are received together from the portable terminal of the video communication service.

If the signal and the number of the buffers are not received, the MPU 100 performs the corresponding function in step 307 (e.g., the MPU 100 generates I frames).

Upon receiving the signal and the number of the buffers, the MPU 100 generates I frames in step 303 and transmits the generated I frames to the portable terminal in step 305.

Herein, the MPU 100 of the counterpart portable terminal can transmit as many of the generated I frames as the number of the buffers, and assign a same sequence number to the I frames to be transmitted.

The same sequence number is assigned to determine whether the portable terminal normally receives as many of the I frames as the buffers.

Next, the MPU 100 finishes this process.

Figure 4:
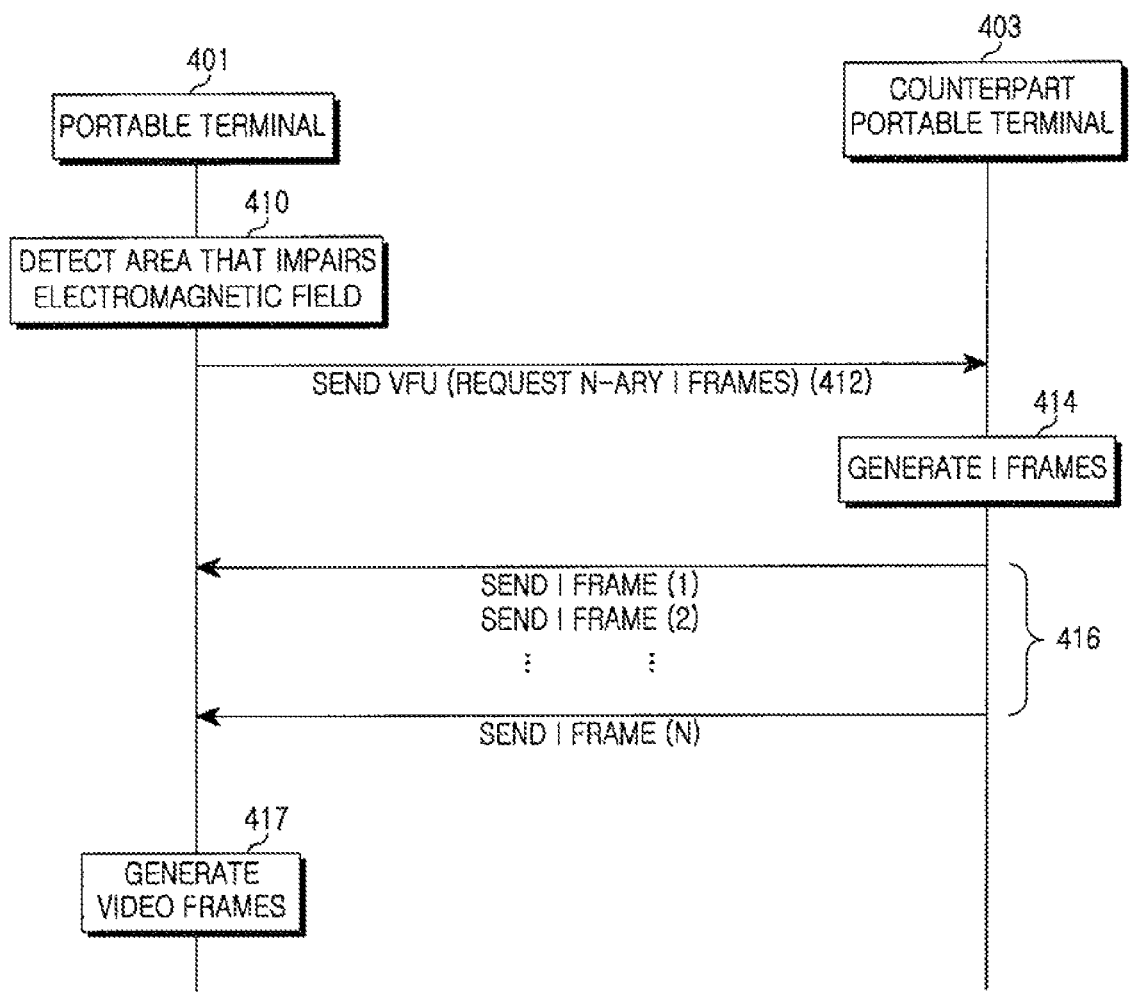
FIG. 4 is a flowchart illustrating a method for recovering video information corrupted by a transmission error in a mobile communication system according to an exemplary embodiment of the present invention.

FIG. 4 is a flowchart illustrating a method for recovering video information corrupted by a transmission error in a mobile communication system according to an exemplary embodiment of the present invention.

The mobile communication system of FIG. 4 can include a portable terminal 401 and a counterpart portable terminal 403.

The portable terminal 401 of the mobile communication system determines if it is located in an area that impairs an electromagnetic field of a transmit/receive signal of the portable terminal by determining the CRC error rate of the received video information in step 410. When determining that the CRC error rate is over a preset threshold, the portable terminal can determine that is positioned in an area that impairs an electromagnetic field of a transmit/receive signal.

When the portable terminal 401 determines that it is located in an area that impairs an electromagnetic field of a transmit/receive signal, the portable terminal 401 transmits the number of buffers for storing I frames and the VFU signal to the counterpart portable terminal 403 in step 412.

Upon receiving the VFU signal and the number of the buffers for storing the I frames from the portable terminal 401, the counterpart portable terminal 403 generates the I frames in step 414 and transmits the generated I frames to the portable terminal 401 in step 416.

The counterpart portable terminal 403 can transmit as many of the generated I frames as the number of the buffers, and assign a same sequence number to the I frames to be sent.

The same sequence number is assigned to determine whether the portable terminal 401 normally receives as many as the I frames as the buffers.

Next, the portable terminal 401 generates buffers for storing as many of the I frames as the number of the buffers, receives the I frames corresponding to the number of the buffers from the counterpart portable terminal 403, and stores the received I frames in the generated buffers respectively.

In step 417, the portable terminal 401 acquires video information from the received I frames and controls to generate video frames with the acquired video information and to output the video frames via the display part 108.

Herein, the portable terminal 401 can acquire the video information through the median operation on the received I frames.

More specifically, the portable terminal 401 arranges N-ary I frames received from the counterpart portable terminal 403 in order and performs the median operation to select a middle value, to thus acquire the video information.

When receiving an even number of I frames, the portable terminal can acquire the video information using an average of two middle values.

The median operation is applied in order to obtain one video information by securely removing pixel values that are too small or too great, which are caused by the transmission error.

As set forth above, the video frames are generated by applying the median operation to the I frames received from the counterpart portable terminal in an area that impairs an electromagnetic field of a transmit/receive signal. Therefore, the VFU technique of the conventional video telephony system can be extended and the video information can be provided with increased quality.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for recovering video information of a video communication service in a terminal, the method comprising:
    determining a number of buffers for storing intra coded (I) frames to be received;
    transmitting, to a counterpart terminal, the number of buffers for storing the I frames;
    receiving a plurality of the same I frames according to the determined number of the buffers from the counterpart terminal;
    acquiring video information by storing I frames received from the counterpart terminal; and
    generating video frames using the acquired video information.

2. The method of claim 1, further comprising outputting the generated video frames.

3. The method of claim 1, wherein the acquiring of the video information comprises:
    receiving a number of I frames corresponding to the number of the buffers;
    arranging the received I frames in an order based on size to measure pixels at a same position; and
    selecting a middle value in the arranged order.

4. The method of claim 1, wherein the determining of the number of the buffers and the transmitting of the number of the buffers to the counterpart terminal together with the Video Fast Update (VFU signal are performed upon determining a Cyclic Redundancy Check (CRC) error rate over a threshold.

5. The method of claim 1, further comprising generating the determined number of buffers, wherein the received I frames are stored in the generated buffers.

6. A method for recovering video information of a video communication service in a terminal, the method comprising:
    receiving a Video Fast Update (VFU) signal comprising a number of buffers for storing intra coded (I) frames, from a counterpart terminal;
    generating a plurality of the same I frames according to the received signal; and
    transmitting to the counterpart terminal as many generated the same I frames as the number of the buffers.

7. The method of claim 6, wherein the transmitting of the generated I frames comprises assigning a same sequence number to the I frames.

8. An apparatus for recovering video information of a video communication service in a portable terminal, the apparatus comprising:
    a video communication manager for determining a number of buffers for storing intra coded (I) frames, for operatively transmitting, to a counterpart terminal, the number of buffers for storing the I frames, and for generating video frames by acquiring video information from the I frames; and
    a Micro-Processor Unit (MPU) for controlling reception of a plurality of the same I frames according to the determined number of the buffers from the counterpart terminal.

9. The apparatus of claim 8, wherein the MPU processes to output the generated video frames.

10. The apparatus of claim 8, wherein the video communication manager acquires the video information by receiving I frames corresponding to the number of the buffers, arranges the received I frames in an order based on size to measure pixels at a same position, and selects a middle value in the arranged order.

11. The apparatus of claim 8, wherein the video communication manager determines the number of the buffers upon determining a Cyclic Redundancy Check (CRC) error rate over a threshold.

12. The apparatus of claim 8, wherein the MPU generates the determined number of buffers, and further wherein the received I frames are stored in the generated buffers.

13. An apparatus for recovering video information of a video communication service in a portable terminal, the apparatus comprising:
    a video communication manager for, in response to receiving a Video Fast Update (VFU) signal which comprises a number of buffers for storing intra coded (I) frames, generating a plurality of the same I frames and transmitting to a counterpart terminal as many generated I frames as the number of the buffers.

14. The apparatus of claim 13, wherein the video communication manager transmits the I frames to the counterpart terminal by assigning a same sequence number to the I frames.

15. A mobile communication system for recovering video information of a video service, the system comprising:
   a first terminal for generating video frames by acquiring video information from intra coded (I) frames; and
   a second terminal for, in response to receiving a signal requesting transmission of the I frames, generating and transmitting a plurality of the I frames to the first terminal.

16. The system of claim 15, wherein the first terminal acquires the video information by receiving a number of I frames corresponding to a number of the buffers, arranges the received I frames in an order based on size to measure pixels at a same position, and selects a middle value in the arranged order.

17. The system of claim 15, wherein the first terminal determines if a Cyclic Redundancy Check (CRC) error rate is over a threshold.

18. The system of claim 15, wherein the second terminal assigns a same sequence number to the I frames transmitted to the first terminal.

19. The method of claim 1, further comprising transmitting the number of the buffers to a counterpart terminal together with a Video Fast Update (VFU) signal.

20. The apparatus of claim 8, wherein the MPU for controlling transmission of the number of the store buffers to a counterpart terminal together with a Video Fast Update (VFU) signal.

* * * * *